United States Patent

Ives et al.

[11] Patent Number: 5,363,709
[45] Date of Patent: Nov. 15, 1994

[54] DIE SENSOR ASSEMBLY

[75] Inventors: Kenneth Ives, Valparaiso; Gregory Keating, Chesterton; Kenneth Sorenson, Valparaiso, all of Ind.

[73] Assignee: Acutus Mold Inc., Pontiac, Mich.

[21] Appl. No.: 986,176

[22] Filed: Mar. 11, 1993

[51] Int. Cl.[5] .............................. G01B 7/14
[52] U.S. Cl. ..................... 73/865.9; 83/522.23
[58] Field of Search ........... 83/522.14, 522.15, 522.16, 83/522.23; 73/760, 865.9; 100/99; 33/710

[56] References Cited

U.S. PATENT DOCUMENTS 3,118,407  1/1964  Robb ........................ 100/99 X

Primary Examiner—Jerry W. Myracle
Attorney, Agent, or Firm—Dykema Gossett

[57] ABSTRACT

A sensor assembly 10 is adapted for use with a typical die 12 and is effective to determine the existence of parallelism and minimum shut height between upper movable die portion 14 and the stationary lower die portion 20.

6 Claims, 7 Drawing Sheets

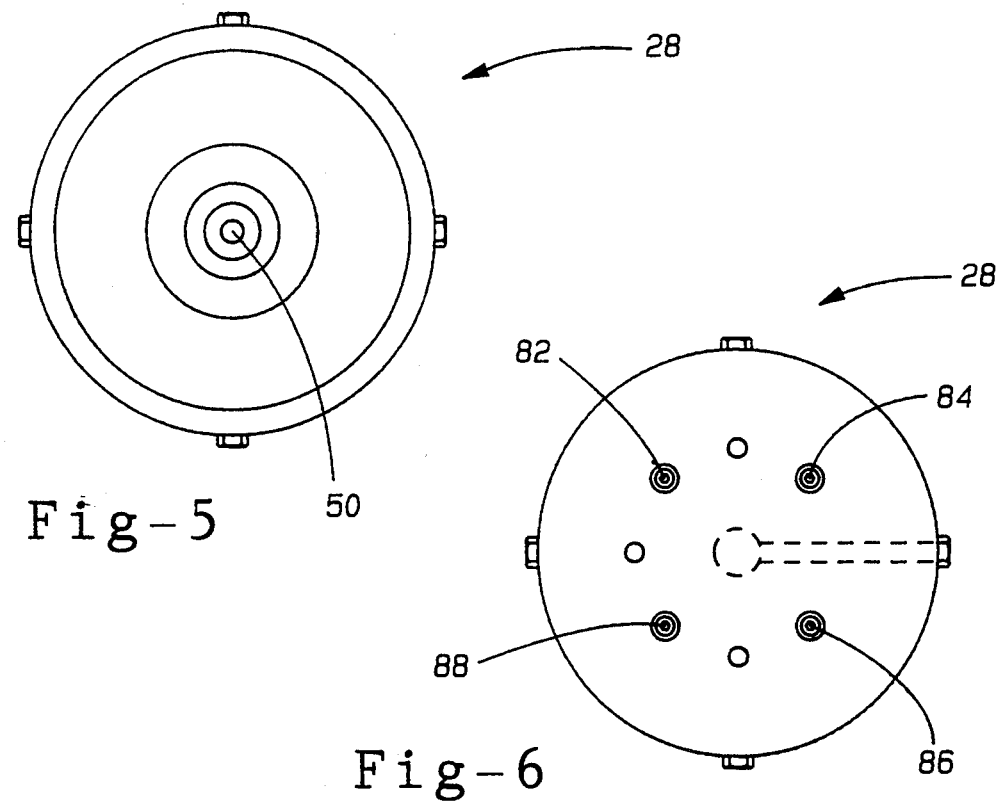
Fig-5
Fig-6
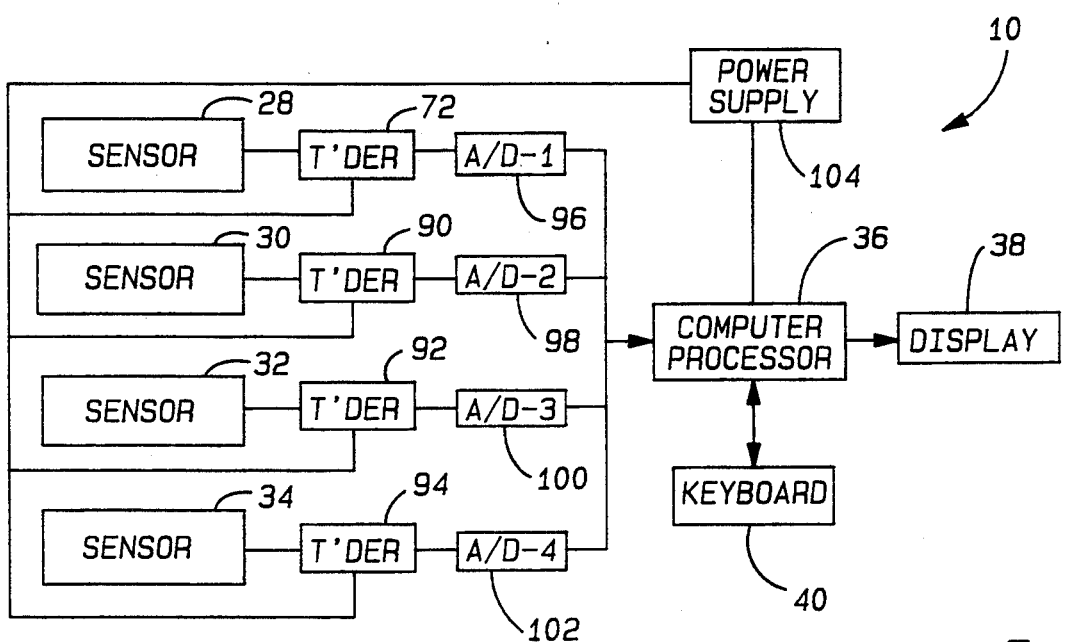
Fig-7

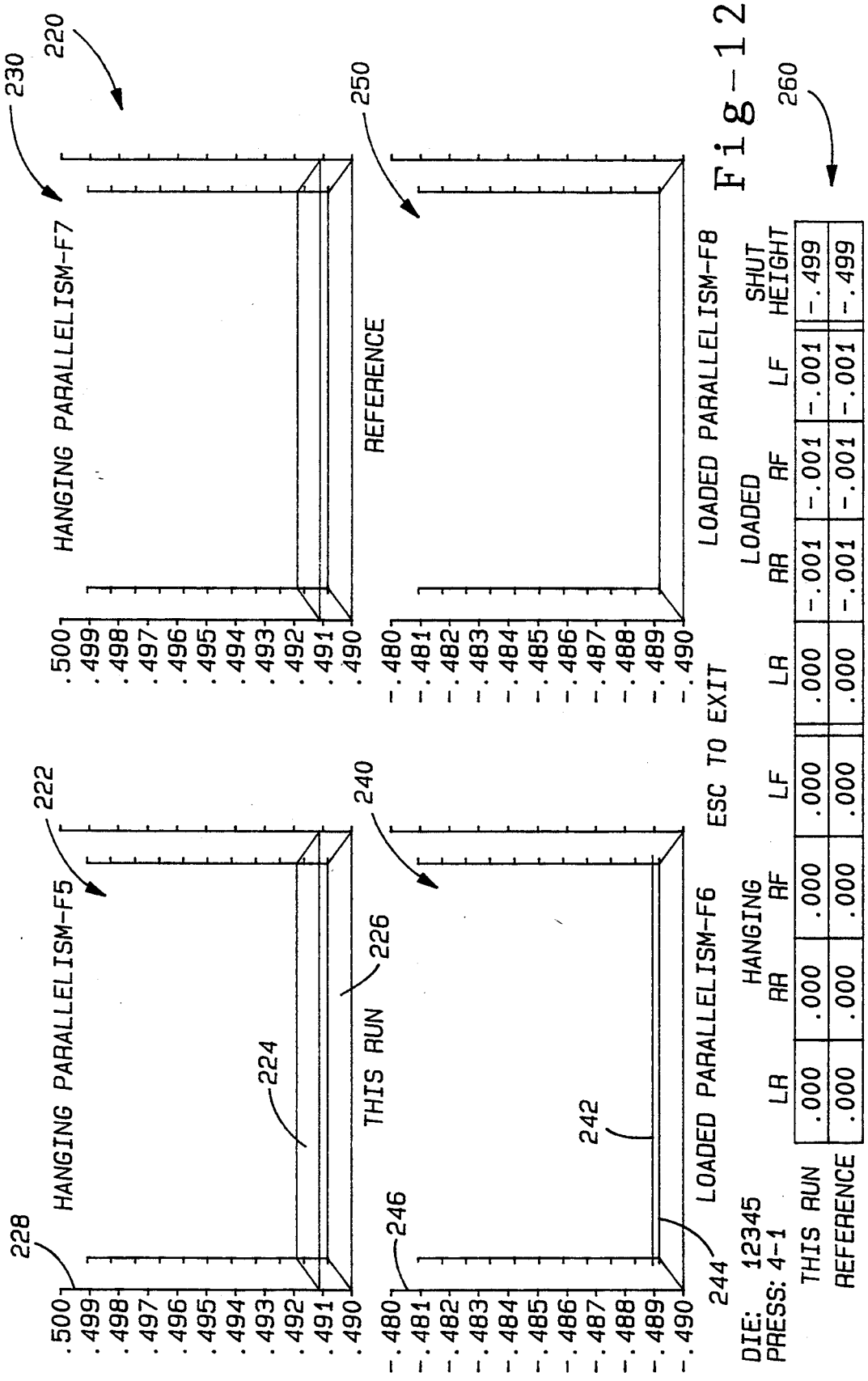

DIE SENSOR ASSEMBLY

BACKGROUND OF THE INVENTION

1. Field of the Invention

This invention relates to a sensor assembly and more particularly, to a sensor and display assembly adapted for use in combination with a die and effective to selectively determine whether the upper and lower die halves are in a parallel relationship and to indicate a minimum distance between the upper and lower die halves.

2. Discussion

Dies are normally used to form a generally rectangular metal blank into a certain and predetermined shape. A typical die includes a substantially stationary lower blank reception portion having a contoured top surface, formed into the certain and predetermined blank-forming shape. The die further includes a top portion which is movable from a first position remote from the lower portion, to a second lower position, where the top die has engaged the blank and forced it fully against the contours of the lower die.

The top die portion includes a generally flat top surface having a protruding or contoured portion which is adapted to mate with the contoured top surface of the lower die. In the second lower die contacting position, the top protruding portion deforms the blank against the contoured top surface of the lower die portion, thereby forming the blank into a shape substantially similar to the shape of the lower die contour.

In order to ensure that the blank is formed into the predetermined and desired shape, the top surface of the upper die must remain substantially parallel to the top surface of the lower die, thereby ensuring that all portions of the blank are forced into the desired engagement with the lower die contours. Moreover, as is further known to those of ordinary skill in the art, in order to prevent excessive blank deformation, the generally flat top die surface must also remain a predetermined and certain distance above the top surface of the lower die during mating. This distance is referred to as "the minimum shut height".

In the past, many hours have been spent manually aligning the die halves, by a trial and error procedure, in order to properly ensure that the top and lower halves are in a parallel relation and that a certain and desired minimum shut height is achieved. Though inefficient, such manual alignment is initially effective in aligning the top and bottom halves, provided that those individuals performing such manual alignment are experienced in such die alignment.

Once properly aligned, continued operation may cause the relative positions of the die halves and the shut height to become misaligned and to change. The degree of these misalignments increases over time. Typically, the existence of such misalignments is not visually noticeable until severely deformed blanks are produced. However, misalignments of a lesser degree may still produce unacceptable blanks which are outside of allowable tolerances. No method currently exists for automatically determining such misalignment absent an exhaustive and continual manual visual inspection of the produced blanks.

There is, therefore, a need to automatically and continually sense or monitor the existence of parallelism between the first movable die portion and the second stationary lower die portion, and to automatically and continually sense or monitor the minimum die shut height.

SUMMARY OF THE INVENTION

It is an object of this invention to provide a sensor assembly, adapted for use with a die and effective to automatically and continually determine the existence of parallelism between a movable upper die portion and a substantially stationary lower die portion.

It is another object of this invention to provide a sensor assembly for use in combination with a die, the sensor assembly being effective to measure or sense a distance between a point on the movable upper die portion and a point on the lower die portion.

It is another object of this invention to provide a sensor assembly which determines the existence of parallelism between a movable upper die portion and a substantially stationary lower die portion, and which is further adapted to display this information to the die operator for quick and easy verification of such parallelism.

According to one aspect of the invention, a sensor assembly is provided. The sensor assembly is adapted for use in combination with a die having a lower portion adapted to receive a blank, and a movable upper portion adapted to be moved from a first position, remote from the lower portion, to a second blank-contacting position. The sensor assembly comprises spring means, positioned upon the lower portion and adapted to be contacted by a surface of the movable upper portion as the movable upper portion contacts said blank, for determining whether a first distance between a first point on the surface of the upper portion and a second point on the lower portion, and a second distance between a second point on the surface of the upper portion and a second point on the lower portion are equal; and plunger means, mounted within but movable with respect to the spring means and adapted to be contacted by the surface of the movable upper portion, for determining whether the first and second distances are equal when the upper portion is in the first position.

BRIEF DESCRIPTION OF THE DRAWINGS

FIG. 5 is a view taken in the direction of arrow 5 of FIG. 1;

FIG. 6 is a bottom view of the sensor shown in FIG. 5;

FIG. 7 is a block diagram of the sensor assembly made in accordance with the teachings of the preferred embodiment of this invention;

FIG. 12 is a typical screen display associated with the display monitor operating in accordance with the teachings of the preferred embodiment of this invention and shown in FIG. 1.

DETAILED DESCRIPTION OF THE INVENTION

Figure 1:
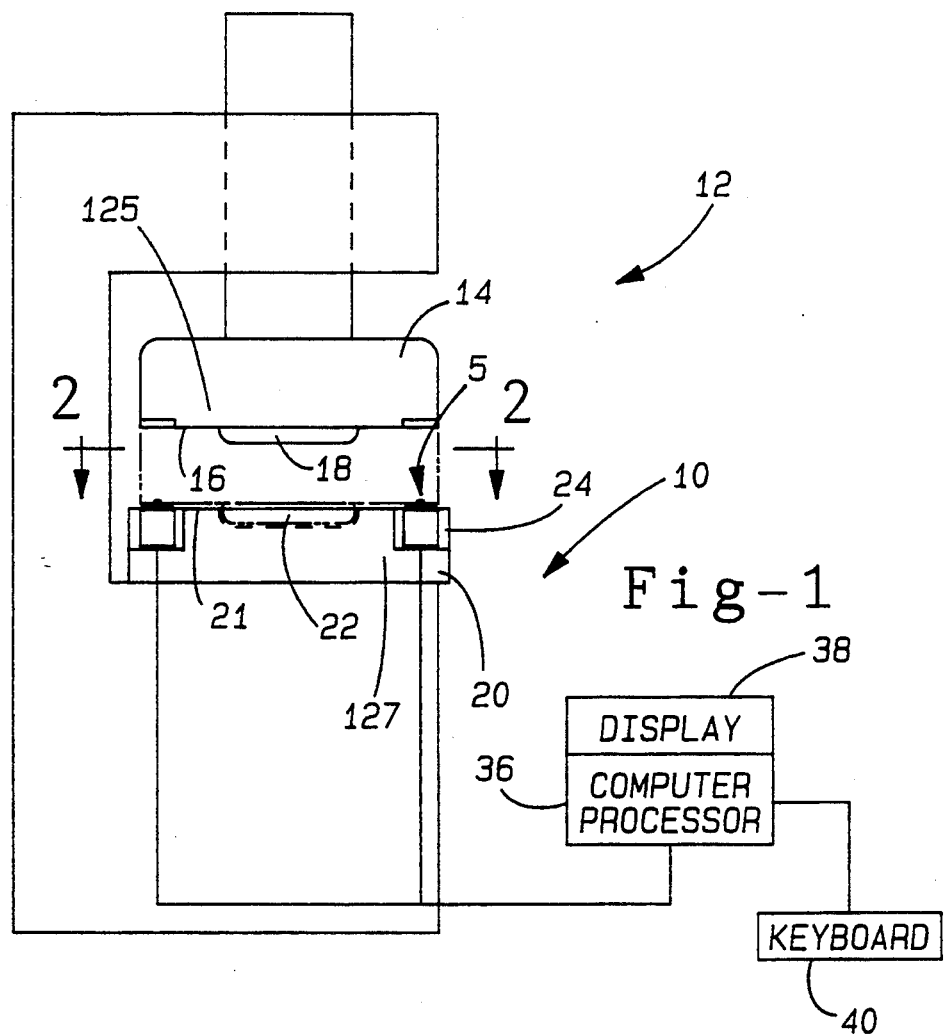
FIG. 1 is a partial side view of a combination of a typical die and a sensor assembly made in accordance with the teachings of the preferred embodiment of this invention.

Referring now to FIG. 1, there is shown a sensor assembly 10, made in accordance with the teachings of the preferred embodiment of this invention, in combination with a typical die 12. As shown, die 12 includes a movable top portion 14 having a substantially flat bottom surface 16, including a protruding contoured portion 18 of a certain and predetermined shape. Die 12 further includes a substantially stationary lower portion 20 having a substantially flat top surface 21. As shown, surface 21 includes a depressed contoured portion 22 which is adapted to selectively and matingly receive portion 18.

As should be known to one of ordinary skill in the art, top portion 14 is adapted to be moved from a first position, remote from portion 20, to a second lower position (shown in phantom) in which portion 18 mates with portion 22 while all of the opposed and mating surfaces of portions 18 and 21 as well as surfaces 16 and 21 remain a certain and predetermined distance apart. Moreover, as further shown, in order to prevent accidental and undesired mating, each portion 14 and 20 includes corner windows or "cut-out" portions 24 which are adapted to cooperatively allow conventional safety blocks (not shown) to be placed upon lower die portion 20, effective to prevent such mating from occurring.

Figure 2:
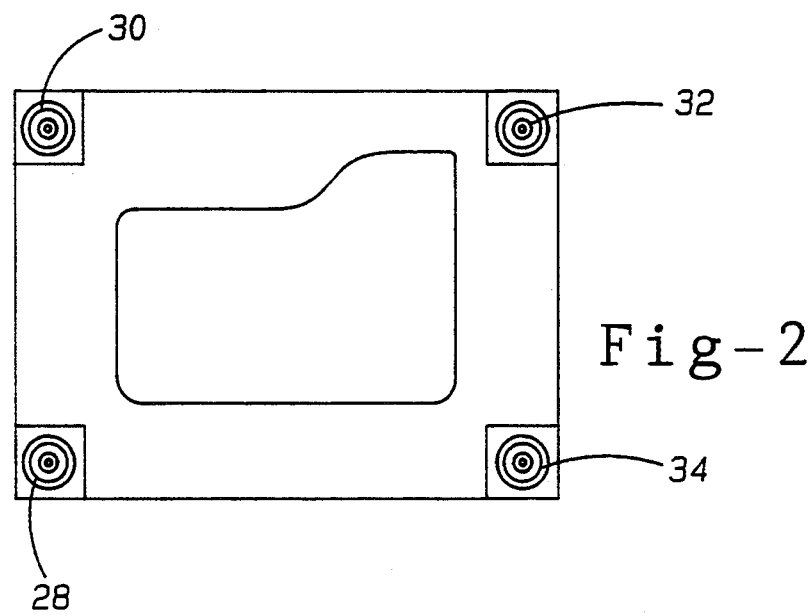
FIG. 2 is a view taken in the direction of arrows 2—2 of FIG. 1.

As further shown in FIGS. 1 and 2, sensor assembly 10 includes sensors 28, 30, 32, and 34, each of which is adapted to be positioned upon a unique corner window 24 of lower die portion 20. Each sensor is electrically coupled to a computer processor 36, having a typical display 38 and a keyboard 40. As will be fully explained later, sensors 28, 30, 32, and 34 cooperate to determine the existence of parallelism between the bottom surface 16 of die portion 14 and the top surface 21 of lower die portion 20, as the movable die portion 14 is lowered into contact with portion 20, and further cooperate to determine the distance between surfaces 21 and 16 when such mating occurs.

Figure 3:
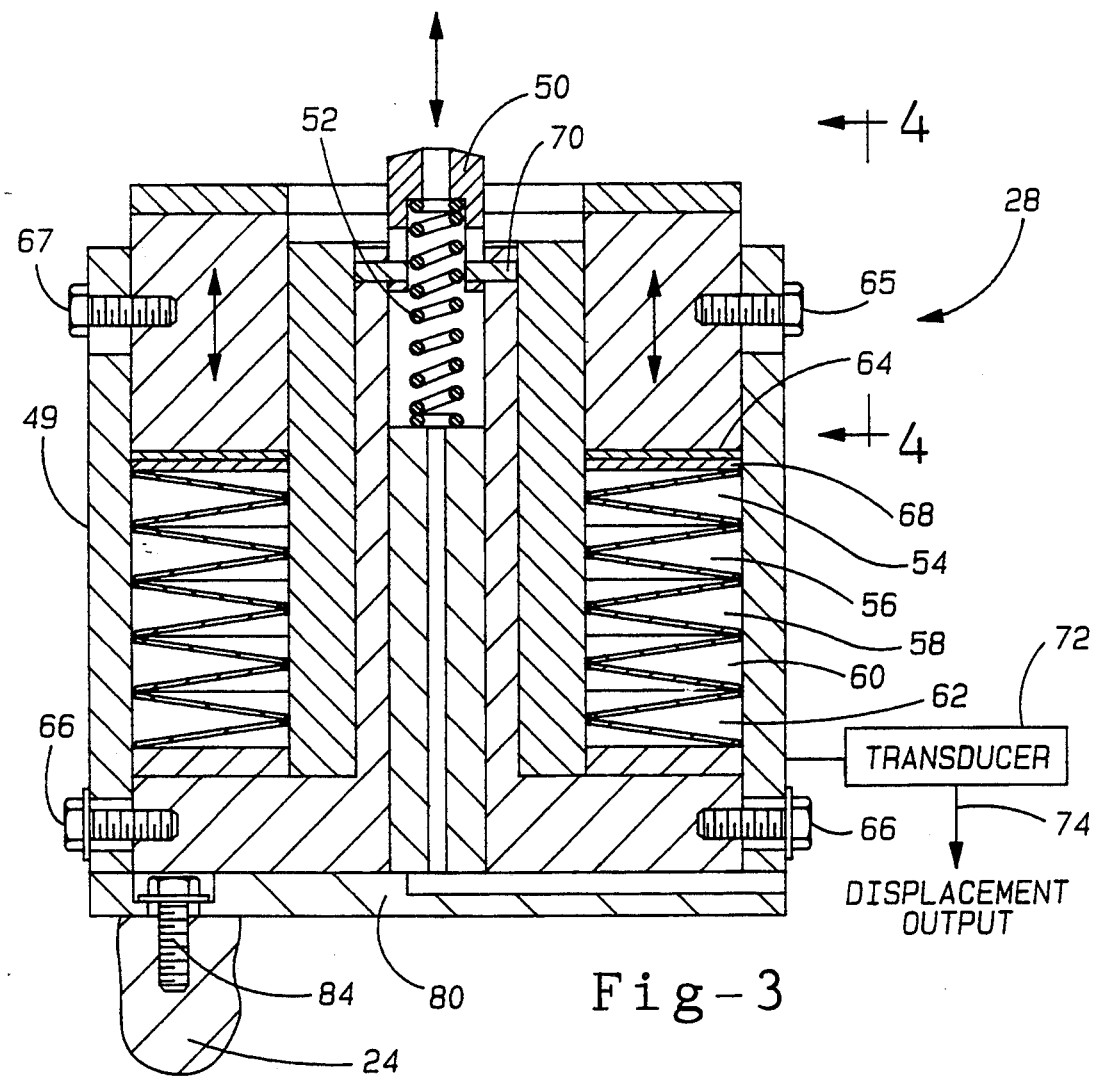
FIG. 3 is a partial side view of one of the sensors made in accordance with the teachings of the preferred embodiment of this invention and shown in FIG. 1.

To understand the operation of sensor assembly 10, reference is now made to FIG. 3, illustrating one of the sensors 28 employed in the preferred embodiment of this invention. The following description of sensor 28 applies equally to sensors 30, 32, and 34. As shown, sensor 28 includes a body 49 having a circularly-shaped cross-section and containing a movable plunger 50, which is normally and outwardly biased by spring 52. Sensor 28 further includes spring means comprising several annular Bellville disk springs 54, 56, 58, 60, and 62 which are circumferentially stacked around plunger 50 and biasing spring 52.

Figure 4:
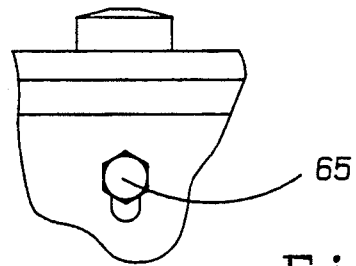
FIG. 4 is a view taken in the direction of arrows 4—4 of FIG. 3.

As shown best in FIGS. 3 and 4, sensor 28 further includes retaining pins 65, 67 which are adapted, as will be known to one of ordinary skill in the art, to maintain the deformation of springs 54, 56, 58, 60, and 62 prior to contact by upper die portion 14. In the preferred embodiment of the invention, springs 54, 56, 58, 60, and 62 are compressed by means of a force applied to annular plates 69, 73 and to shims 64, 68. After desired compression is achieved, pins 65, 67 are inserted (as shown) to maintain the compression. Screws 66 by their reception in vertical slots in body 49, permit vertical adjustment of plunger supporting sleeve 77. Pins 70 fixed in sleeve 77 and received in vertical slots in plunger 50 limit the vertical travel of plunger 50 under the opposed forces of spring 52 and engagement of top portion 14. Such plunger depth adjustment, as will be discussed, is effective to fix the sensing distance used to determine die parallelism prior to mating. Sensor 28 is coupled to a typical transducer 72, which is adapted to provide an electric voltage output signal 74, proportional to the amount of deformation or contact force applied to springs 52–62.

As should be apparent to one of ordinary skill in the art, transducer 72 may comprise a typical and conventional direct current displacement transducer; linear variable displacement transducer; linear potentiometer; magnetic restricted transducer; or a variety of other types of conventional transducers which are currently and commercially available. Moreover, as is best shown in FIGS. 3 and 6, sensor 28 further includes a plate 80 which is attached to housing 42 and adapted to secure sensor 28 to window portion 24 by means of typical fasteners or bolts 82, 84, 86, and 88.

To further understand the operation of sensor assembly 10, reference is now made to FIG. 7. As shown, assembly 10 further includes transducers 90, 92, and 94, each of which is substantially identical to transducer 72 and which are respectively and uniquely coupled to sensors 30, 32, and 34. Each transducer 72, 90, 92, and 94 is adapted to transmit spring deformation electrical output signals to respective analog to digital converters 96, 98, 100, and 102. The digital signal outputs from converters 96, 98, 100, and 102 are then input to computer processor 36 which processes these signals in a manner which will be discussed. Lastly, as shown in FIG. 7, assembly 10 further includes a typical electrical power supply 104 which is coupled to each of the transducers 72, 90, 92, and 94 and which is adapted to allow transducers 72, 90, 92, and 94 to perform their electrical signal generating function.

It should be apparent to one of ordinary skill in the art that transducers 72, 90, 92, and 94 produce an analog electrical signal which is representative of the amount of deformation force which is imparted to the springs 52 and 54–62 by die portion 14. In this manner, the output signal from transducers 72, 90, 92, and 94 will be substantially equal only if the amount of force imparted to each of the sensors 30–34 (i.e. deformation of springs 54–62) is substantially equal, indicating a parallel arrangement between upper die portion 14 and stationary lower die portion 20. If this force and/or spring deformation is not substantially equal, the analog signal emanating from transducers 72–94 will not be similar. In this manner, as will be explained, computer processor 36 uses this information to display the relative position and alignment of surface 16 to surface 21.

Figure 8:
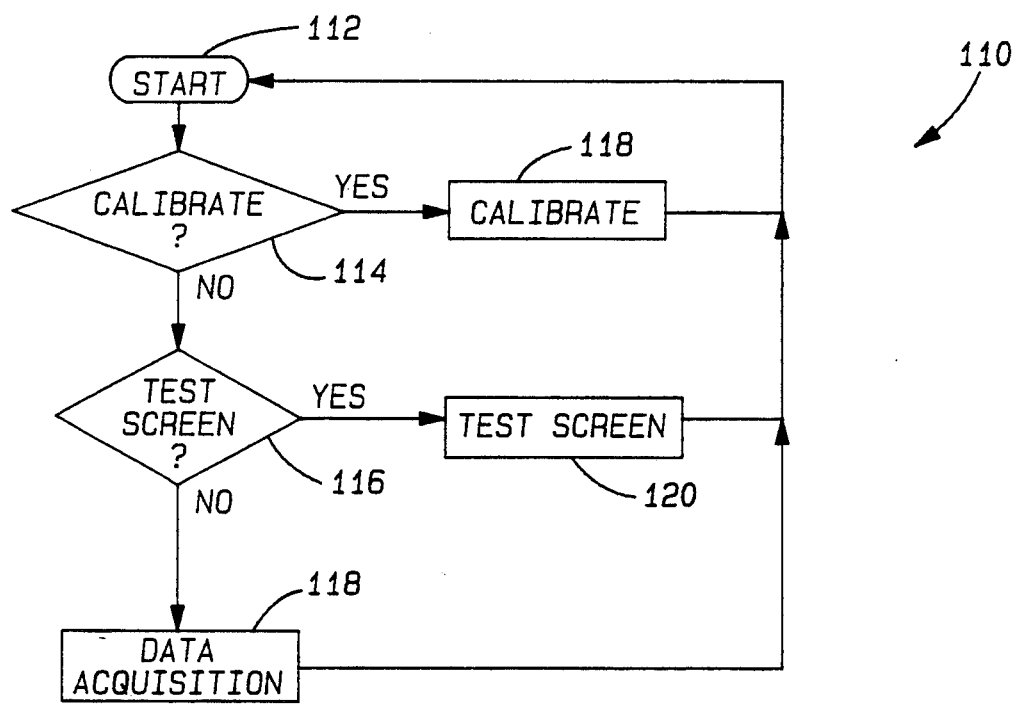
FIG. 8 is a flowchart illustrating the sequence of steps associated with the stored software program used by the computer processor of the preferred embodiment of this invention.

To fully understand the operation of the software stored within processor 36, reference is now made to flowchart 110 of FIG. 8. As shown, computer processor 36 begins from an initial step 112, and enters step 114 which requires processor 36 to determine if system calibration is required. If such calibration is not required by a user of system 10, step 114 is followed by step 116. Calibration is required if a user enters an appropriate "calibration" command from keyboard 40. Alternatively, step 114 is followed by step 118 in which a calibration routine is performed. Step 118 is followed by step 112.

In step 116, computer processor 36 determines whether a user desires to "test a screen". If a "test screen" command has been generated by keyboard 40, step 116 is followed by step 120, in which computer processor 36 performs the "test screen" operation. Alternatively, step 116 is followed by step 118 in which a "data acquisition" routine is performed. Step 118 is followed by step 112.

Figure 9A:
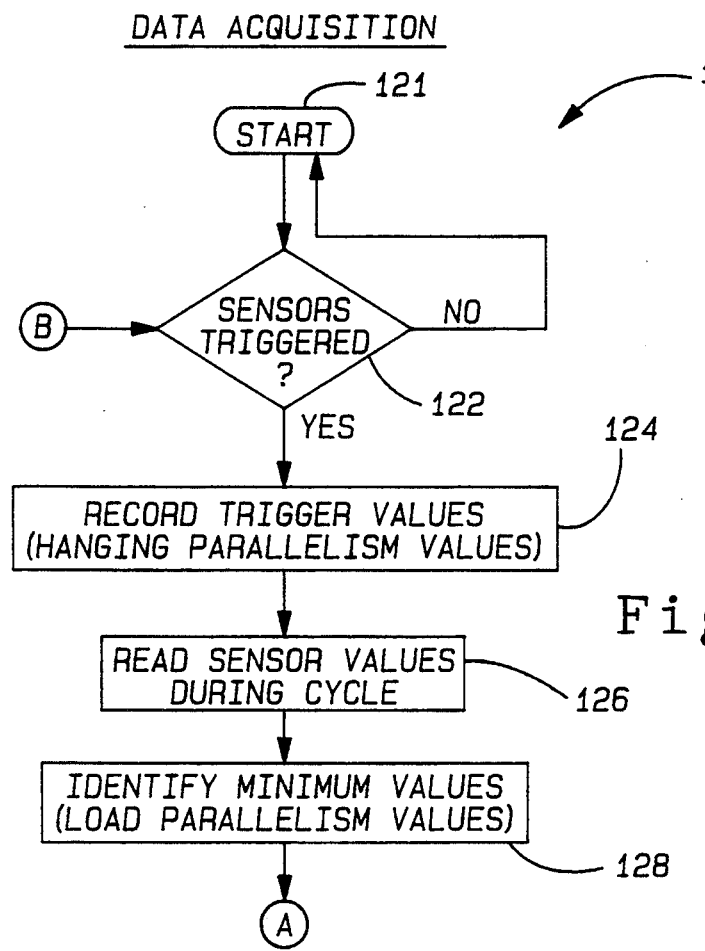
FIGS. 9(a-b) are flowcharts illustrating the sequence of steps associated with the step of "Data Acquisition", shown in FIG. 8.
Figure 9B:
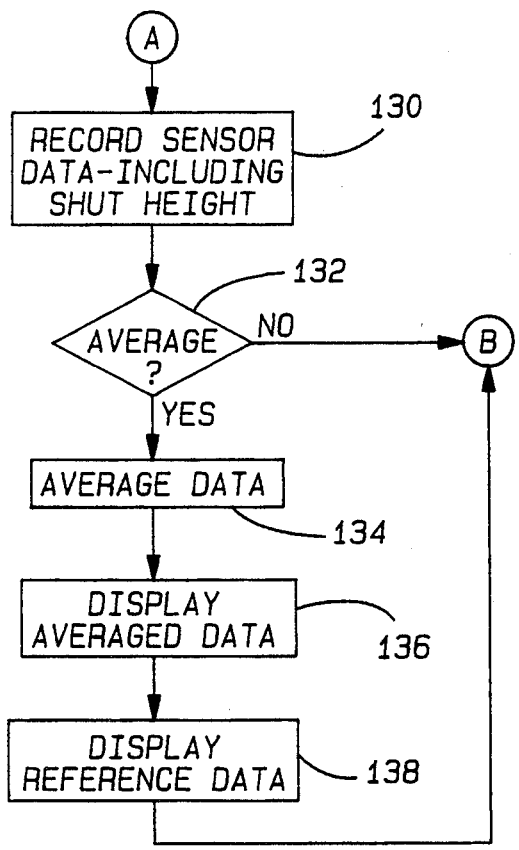

To understand the sequence of steps involved in the "data acquisition" step 118 of flowchart 110, reference is now made to FIGS. 9(a–b), in which the sequence of steps associated with step 118 is shown.

Specifically, step 118 begins from an initial step 121 and enters step 122, in which computer processor 36 determines if all of the sensors 28, 30, 32, or 34 have been "triggered". Such triggering initially occurs when top die portion 14 contacts plunger 50, thereby imparting force to spring 52. Triggering continues until mating has occurred and the top portion 14 deforms springs 54–62. In this manner, a parallel profile may be obtained of the position of surface 16 relative to surface 21, as portion 14 begins to descend upon die portion 20. The distance that plunger 50 may be depressed determines the amount of information which may be obtained before mating occurs. In some applications, such distance should be maximized in order to ensure that a true pre-mating parallel profile has been obtained. The amount of deformation associated with springs 54–62 is used to determine mating parallelism. Thus, plunger 50 and spring 52 cooperatively measure "pre-loaded" or "pre-mating" parallelism or "pre-mating" clearance between surfaces 16 and 21. Deformation of springs 54–62 is then used to determine loaded parallelism while deformation of spring 52 has no further effect on parallelism determination during such loading.

If none of the sensors has been triggered, step 122 is followed by the initial step 121. If all of the sensors 28, 30, 32, and 34 have been triggered, step 122 is followed by step 124 in which the output signal from transducers 72, 90, 92, and 94 is input to computer processor 36. Step 124 is followed by step 126 in which the sensor output signals are read as surface 18 mates with surface 22. In the preferred embodiment of this invention, processor 36 includes a table which uniquely associates several forces with a unique distance between a point 125 on the surface of the upper die 14 and a point 127 on the surface of lower die 20. In the preferred embodiment of this invention, points 125 and 127 should be in close proximity to the sensor 28 that provide such distance measurement in order to maximize the accuracy of the system. Distances associated with forces not appearing in this table are obtained through typical linear interpolation techniques. The development of this table is discussed in the "calibration" step; however, it should be apparent that in this manner, such distances may be obtained by processor 36 from each of the sensors 28–34. Moreover, in the preferred embodiment of this invention, processor 36 is further adapted to subtract the distance between points 125 and 127 obtained at the start of triggering from that obtained at mating. This value is then stored and is representative of the distance over which data is obtained. Such distance may be adjusted (i.e. by adjusting the plunger 50) in order to increase sensing accuracy.

After a "cycle" has been completed (i.e. after mating occurs and die portion 14 moves to its initial and remote position), step 126 is followed by step 128 in which the minimum distance values are identified. Such minimum distance values are associated with the final position of the flat portion of surface 16 above the flat portion of surface 21 and give the minimum shut height. Step 128 is followed by step 130 in which computer processor 36 records the sensor signal and distance data and determines the height of portion 14 above die 20. Step 130 is followed by step 132 in which processor 36 determines whether an average value is required.

If no average is required, step 130 is followed by step 122. Alternatively, step 132 is followed by step 134 in which all of the sensor and distance data is averaged in a conventional manner. Step 134 is followed by step 136 in which the average data is displayed upon display 38. Step 136 is followed by step 138 in which reference or desired data, which has been previously stored in processor 36, is also displayed upon display 38. Step 138 is followed by step 122. Such "reference" data will be explained in reference to the displays shown in FIG. 12.

In this manner, it should be apparent to one of ordinary skill in the art that sensor assembly 10 generates and captures data associated with the position of the movable upper die portion 14 relative to the position of substantially stationary lower die portion 20, in order to determine the height that die portion 14 is positioned above lower portion 20 when portion 18 mates with portion 22. Moreover, it should also be apparent to one of ordinary skill in the art that assembly 10 also is effective to determine the existence of parallelism between upper portion 14 and lower portion 20, by ascertaining distances between various points on portions 18 and 20 and by ascertaining whether these distances are substantially equal.

Figure 10:
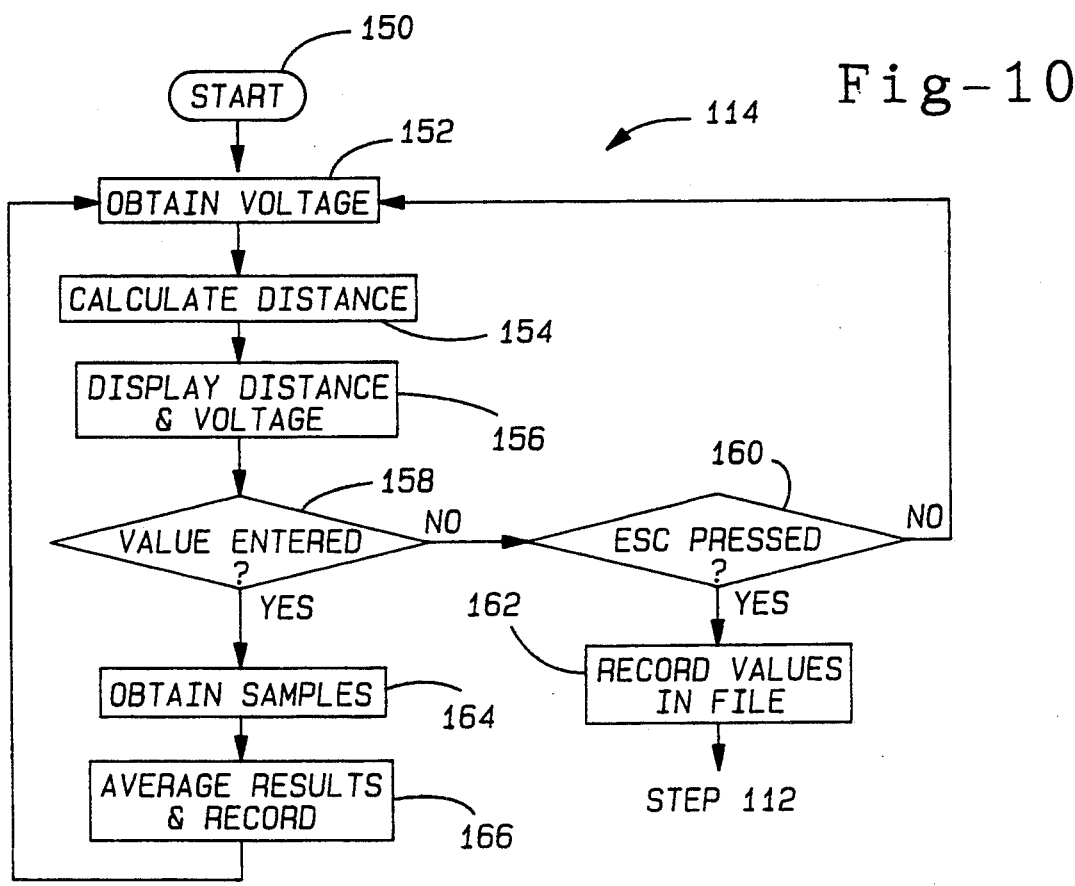
FIG. 10 is a flowchart illustrating the sequence of steps associated with the "Calibrate" step shown in FIG. 8.

To fully understand the steps associated with the "calibrate" step 114, reference is now made to FIG. 10. As shown, step 114 begins with an initial step 150 in which portion 14 is moved a predetermined distance from portion 20. Step 150 is followed by step 152. In step 152, at least one of the sensors 28–34 is triggered and the corresponding voltage output signals are monitored. In step 154, the corresponding distance between two predetermined points 125, 127 on respective portions 14 and 20, is obtained by the stored table. The distance and voltage signal value are both displayed upon monitor 38, in step 156.

Step 156 is followed by step 158, in which a typical precision micrometer is used to measure the displayed distance. The measured distance is then selectively input to processor 36, if the measured distance differs from the displayed distance. If no such measured distance value is entered, step 158 is followed by step 160. If the "escape" key has been pressed, step 160 is followed by step 162. Alternatively, step 160 is followed by step 162 in which the distance and associated signal values of step 166 (if any) are stored within processor 36.

If a measured distance value has been entered, step 158 is followed by step 164 in which sensor voltage samples are obtained from the sensors 28–34. Step 164 is followed by step 166 in which the sample results are averaged in the conventional manner and recorded in computer processor 36 in order to obtain a new corresponding voltage signal for the desired distance value. Step 166 is followed by step 152. It should be noted that an initial calibration routine, unlike the previously-described automatic routine, requires a "trial and error" development of the voltage-distance table.

Figure 11:
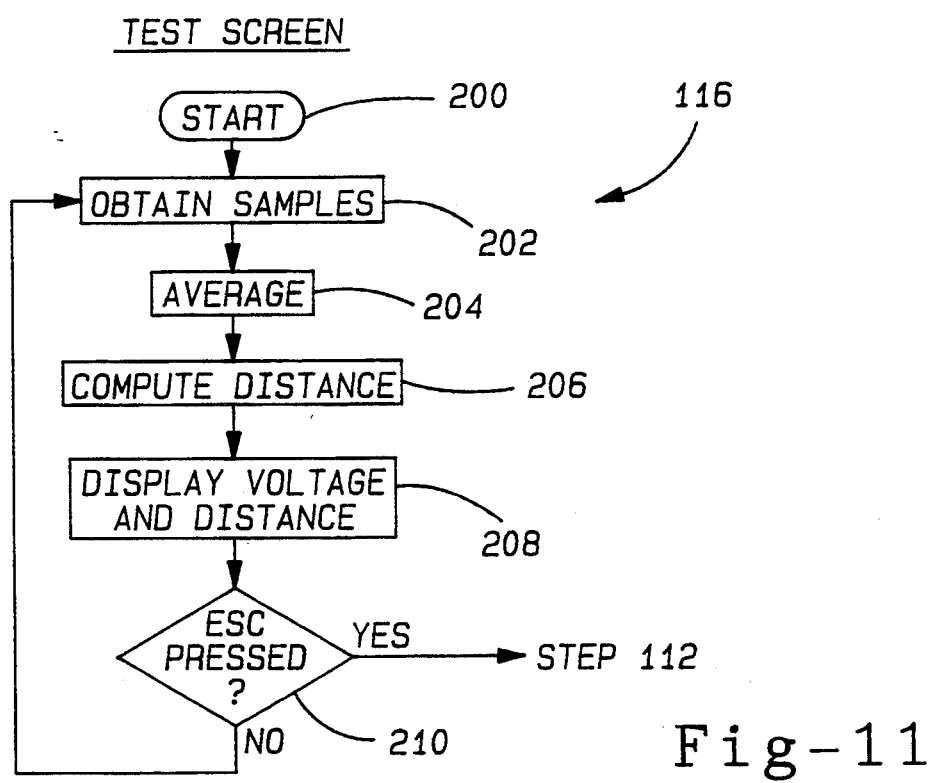
FIG. 11 is a flowchart illustrating the sequence of steps associated with the step of "Test Screen", shown in FIG. 8.

To fully understand the sequence of steps associated with the "test screen" step 116 of flowchart 110, reference is now made to FIG. 11. As shown, step 116 begins with an initial step 200, and is followed by a second step 202 in which voltage signal samples are obtained for each of the sensors 28, 30, 32, and 34. Step 202 is followed by step 204 in which the samples are averaged. Step 204 is followed by step 206 in which the corresponding die distances are computed, in a known manner, from the average values associated with step 204 and the previously-described voltage-distance table.

Step 206 is followed by step 208 in which the voltage and distance are displayed upon display 38. In this manner, "true" distance and voltage measurements may be made by use of the micrometer and a voltage meter and compared with the displayed results in order to determine if the system is functioning correctly. Step 208 is followed by step 210 in which computer processor 36 determines whether the "escape" key is pressed. If such an escape key is pressed, step 210 is followed by step 112. Alternatively, step 210 is followed by step 202.

To understand the design of the screens displayed upon display 38, reference is now made to typical screen 220, shown in FIG. 12. As shown, screen 220 includes a first screen portion 222 in which the position of upper die 14 is graphically displayed by means of a rectangular-shaped icon 224. The position of lower die portion 20 is also shown by a generally rectangular-shaped icon 226. Both positions are associated with the "pre-mating" arrangement in which only spring 52 is deformed. As shown, screen portion 222 further includes a measuring portion 228 which graphically illustrates the distance between the displayed portion icons 224 and 226.

Screen 220 further includes a second screen portion 230, substantially identical to portion 222, with the exception that portion 230 is made to define the desired or "referenced" parallelism between die portions 14 and 20. Such "referenced" parallelism represents the desired "non-mating" positions of the die portions 14, 20 and its concurrent display with portion 222 allows a user to easily determine deviations from the desired arrangement.

Screen 220 further includes a third screen portion 240 in which substantially horizontal icons 242 and 244 are respectively used to graphically illustrate the positions of die portions 14 and 20 during mating. In this manner, a user may easily determine the relative positions of mated die portions 14 and 20. As before, screen portion 240 includes a measurement section 246 which graphically illustrates the distance between portions 14 and 20.

Screen 220 further includes a fourth screen portion 250 which is substantially identical to screen portion 240, with the exception that screen portion 250 illustrates the desired or "referenced" positions of the dies. The concurrent display of portion 250 with portion 240 allows a user to easily determine deviations from the desired mating positional arrangement.

Lastly, screen 220 includes a fifth screen portion 260 which comprises a listing of "shut height" and distances associated with each sensor 28–34 during cyclic mating.

It should be appreciated by one of ordinary skill in the art that the foregoing invention allows for the automatic and continued sensing or monitoring of the existence of parallelism between the top and lower die halves. Moreover, this invention also allows for the automatic and continued monitoring of the minimum shut height. In this manner, it should be appreciated that blanks may be formed which are of a consistent and desirable shape and quality and that system 10 may be ported and adapted for use on several die arrangements, thereby further adding to the utility of the invention.

It is to be understood that the invention is not limited to the exact construction or method illustrated and described above, but that various changes and modifications may be made without departing from the spirit and scope of the invention as defined in the following claims.

We claim:

1. A sensor assembly for use in combination with a die having a lower portion adapted to receive a blank, and a movable upper portion adapted to be moved from a first position, in which said upper portion is remote from said lower portion, to a second blank-contacting position, said sensor assembly comprising:
   spring means, positioned upon said lower portion and adapted to be contacted by a surface of said movable upper portion as said movable upper portion contacts said blank, for determining whether a first distance between a first point on said surface and a first point on said lower portion, and a second distance between a second point on said surface and a second point on said lower portion are equal; and
   plunger means, movably coupled to said spring means and adapted to be contacted by said surface of said movable upper portion, for determining whether said first and said second distances are equal when said upper portion is in said first position.

2. The sensor assembly of claim 1, further comprising display means, coupled to said spring means, for displaying said first and said second distance when said upper portion is in said second position.

3. The sensor assembly of claim 2, further comprising storage means, coupled to said display means, for storing values corresponding to said first and second distances.

4. The sensor assembly of claim 3, further comprising computer means for producing and storing a second value by subtracting said first distance obtained when said upper portion is in said first position from said first distance obtained when said upper portion is in said second position.

5. A die assembly comprising:
   a lower die having a contoured top surface of a certain and predetermined shape which is adapted to supportably receive a blank;
   a movable upper die having a protruding bottom surface, said upper die being movable from a first position remote from said lower die to a second position in which said protruding bottom surface mates with said contoured top surface thereby forming said blank into a certain and predetermined second shape; and
   sensor means, positioned upon at least one corner of said lower die, for determining the existence of parallelism between said movable upper die and said lower die when said protruding bottom surface mates with said contoured surface.

6. A sensor assembly for use in combination with a die having a lower portion adapted to receive a blank, and a movable upper portion adapted to be moved from a first position, in which said upper portion is remote from said lower portion, to a second blank-contacting position, said sensor assembly comprising:
- a sensor body mounted on said lower portion and containing spring means adapted to be contacted by said upper portion when said upper portion is in said second position;
- plunger means resiliently mounted for vertical movement within said sensor body and relative to said spring means, and adapted to be contacted by said upper portion when said upper portion is in said first position;
- said spring means and said plunger means being biased upwardly toward said top portion; and
- transducer means, coupled to said spring means and to said plunger means for producing a first signal when said upper portion contacts said plunger means and a second signal when said upper portion contacts said spring means, said first and second signals being cooperatively effective to determine the existence of parallelism between said upper and lower portions of said die as said upper portion moves from said first to said second position.

* * * * *